United States Patent
Asokan et al.

(10) Patent No.: US 10,162,496 B2
(45) Date of Patent: Dec. 25, 2018

(54) PRESENTATION OF METADATA AND ENHANCED ENTERTAINMENT MEDIA CONTENT

(71) Applicant: INTEL CORPORATION, Santa Clara, CA (US)

(72) Inventors: Ashwini Asokan, Sunnyvale, CA (US); Michael Payne, Beaverton, OR (US); Brian D. Johnson, Portland, OR (US); Atul Hatalkar, Chandler, AZ (US); Delia Grenville, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/949,242

(22) Filed: Nov. 23, 2015

(65) Prior Publication Data
US 2016/0132217 A1    May 12, 2016

Related U.S. Application Data

(62) Division of application No. 13/381,354, filed as application No. PCT/US2010/061364 on Dec. 20, 2010, now Pat. No. 9,235,323.

(51) Int. Cl.
*G06F 3/0484* (2013.01)
*G06Q 30/02* (2012.01)
(Continued)

(52) U.S. Cl.
CPC ........ *G06F 3/04842* (2013.01); *G06F 3/0482* (2013.01); *G06F 3/04845* (2013.01);
(Continued)

(58) Field of Classification Search
CPC .......... G06F 3/00; G06F 3/048; G06F 3/0481; G06F 3/0482; G06F 3/0484;
(Continued)

(56) References Cited

U.S. PATENT DOCUMENTS

| 8,677,273 B2 | 3/2014 | Rowell |
| 8,850,478 B2 * | 9/2014 | Moshiri ............. H04N 5/44513 725/39 |

(Continued)

FOREIGN PATENT DOCUMENTS

| CN | 1741532 | 3/2006 |
| CN | 101842769 | 9/2010 |

OTHER PUBLICATIONS

Office Action from Counterpart TW Patent Application No. 100143174, Mailed Dec. 1, 2014, 3 pages.
(Continued)

*Primary Examiner* — Xiomar L Bautista
(74) *Attorney, Agent, or Firm* — Womble Bond Dickinson (US) LLP

(57) ABSTRACT

Techniques are disclosed that involve providing enhanced user experiences involving the consumption and management of content. For instance, embodiments provide user interface elements that present information regarding content that overcomes barriers or silos between application and platforms. Examples of such user interface elements include a three dimensional carousel, a preview stack, a favorites button, and a My Channel user interface. Also, embodiments may provide techniques for obtaining contextual content. Such techniques include, but are not limited to, zooming mechanisms and combining (or "mashup") mechanisms.

20 Claims, 11 Drawing Sheets

(51) Int. Cl.
*G06F 3/0482* (2013.01)
*G06T 3/40* (2006.01)

(52) U.S. Cl.
CPC .......... *G06Q 30/0255* (2013.01); *G06T 3/40* (2013.01); *G06T 2200/24* (2013.01)

(58) Field of Classification Search
CPC ...... G06F 3/04817; G06F 9/44; G06F 9/4443; G06Q 10/10; G06Q 50/01; H04N 5/44543; H04N 5/50; H04N 21/4722
See application file for complete search history.

(56) References Cited

U.S. PATENT DOCUMENTS

| | | | |
|---|---|---|---|
| 8,863,199 B1* | 10/2014 | Otto | H04N 5/44513 725/40 |
| 2004/0070593 A1 | 4/2004 | Neely | |
| 2004/0123320 A1 | 6/2004 | Daily et al. | |
| 2004/0252119 A1* | 12/2004 | Hunleth | G06F 3/0482 345/440 |
| 2006/0109242 A1* | 5/2006 | Simpkins | G06F 3/013 345/156 |
| 2007/0011702 A1 | 1/2007 | Vaysman | |
| 2007/0157160 A1 | 7/2007 | Arend et al. | |
| 2007/0186186 A1 | 8/2007 | Both et al. | |
| 2007/0206247 A1 | 9/2007 | Kaplan | |
| 2008/0016533 A1 | 1/2008 | Rothschild | |
| 2008/0140523 A1 | 6/2008 | Mahoney | |
| 2009/0089352 A1 | 4/2009 | Davis | |
| 2009/0160933 A1 | 6/2009 | Herz | |
| 2009/0228922 A1 | 9/2009 | Haj-Khalil | |
| 2009/0259936 A1 | 10/2009 | Tanskanen | |
| 2010/0106730 A1 | 4/2010 | Aminian | |
| 2010/0185978 A1* | 7/2010 | Laurie | G06F 9/4443 715/802 |
| 2010/0251305 A1 | 9/2010 | Kimble et al. | |
| 2011/0299832 A1* | 12/2011 | Butcher | H04N 21/23431 386/248 |
| 2011/0316884 A1* | 12/2011 | Giambalvo | G06F 17/30058 345/660 |
| 2012/0008916 A1* | 1/2012 | Lane | G11B 27/034 386/241 |
| 2012/0079382 A1 | 3/2012 | Swenson | |
| 2012/0117471 A1* | 5/2012 | Amidon | H04N 5/76 715/716 |
| 2014/0289650 A1 | 9/2014 | Cotlarciuc | |

OTHER PUBLICATIONS

Taiwan IPO Search Report for TW Counterpart Application No. 1011143174, 2 pages, Aug. 31, 2014.
European Search Report for EP Counterpart Application No. PCT/US2010/061364, 8 pages, Nov. 6, 2014.
PCT International Search Report, Written Opinion, PCT/US2010/061364, Mailing Date Jul. 4, 2013, 8 pages.
Chinese Application No. 201080070784.5 1$^{st}$ Office Action, Mailed Sep. 18, 2015, 11 pages.

* cited by examiner

PRESENTATION OF METADATA AND ENHANCED ENTERTAINMENT MEDIA CONTENT

CROSS-REFERENCE TO RELATED APPLICATIONS

The present application is a division of prior filed U.S. patent application Ser. No. 13/381,354 filed Dec. 26, 2013, entitled, "Techniques for Management and Presentation of Content", by Ashwini Asokan et al, which is a national stage application of International Application No. PCT/US10/61364 filed Dec. 20, 2010, the priorities of which are hereby claimed.

BACKGROUND

Users are becoming able to concurrently receive various forms of information from various sources. For instance, consumer electronics devices (e.g., personal computers, mobile devices, set-top-boxes, televisions, etc.) may include multiple software frameworks, each providing one or more applications and content. For example, each framework may be associated with (or provided by) an equipment manufacturer, a content provider, and/or an individual software vendor (ISV).

Unfortunately, the ability to manage and navigate through such information is limited by effective barriers or silos that exist between such applications, frameworks, and/or information sources. Thus, a user may have to repeatedly perform operations that involve finding and viewing content. Moreover, users are currently limited in finding contextual information or content pertaining to information or content that is currently being received.

Personalization is becoming increasingly important in establishing operational characteristics for devices. However, devices do not currently provide much assistance in personalizing particular content or information that is provided to users.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Figure 1:
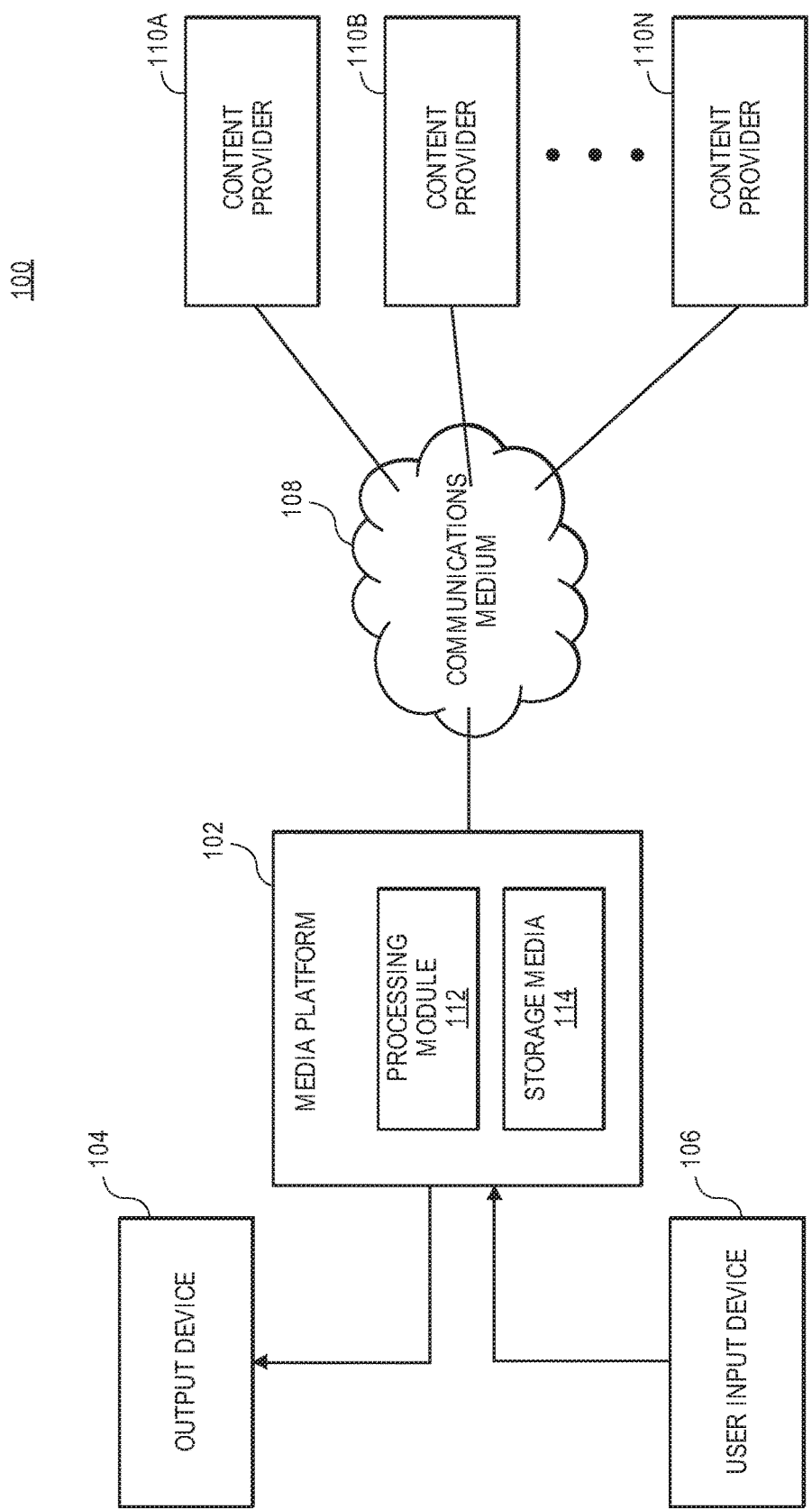
FIG. 1 is a diagram of an exemplary operational environment.

Embodiments provide techniques that involve providing enhanced user experiences involving the consumption and management of content. For instance, embodiments provide user interface elements that present information regarding content that overcomes barriers or silos between application and platforms. Examples of such user interface elements include a carousel, a preview stack, an add-to-favorites button, and a My Channel user interface. Also, embodiments may provide techniques for obtaining contextual content. Such techniques include, but are not limited to, zooming mechanisms and combining (or "mashup") mechanisms.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Operations for the embodiments may be further described with reference to the following figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context. Consumer electronics devices, such as televisions, set top boxes, personal computers, and handheld devices (e.g., smartphones and personal digital assistants (PDAs)) may include multiple software frameworks, each providing one or more applications and content. For example, each framework may be associated with (or provided by) an equipment manufacturer, a content provider, and/or an individual software vendor (ISV).

Unfortunately, such frameworks establish barriers (or "silos") that separate information, content, and applications that are commonly employed by a user. This may cause users to get stuck in separate application or content frameworks Embodiments may advantageously overcome such barriers or silos by identifying, collating and accessing content from all these sources using a unified UI across these varied frameworks.

As a result, users may advantageously navigate and enjoy what they want. This provides users with rich and compelling experiences that involve using a mix or "mash up" of multiple applications from across frameworks, irrespective of source.

Such techniques provide improvements over conventional aggregators (e.g., instant messaging aggregators like ICQ), bookmarking systems, and other techniques, which are each tied to a single application. This is because such conventional techniques do not aggregate content from multiple application types, software frameworks, or platforms.

FIG. 1 is a diagram of an exemplary operational environment 100 in which the techniques described herein may be employed. This environment includes a media platform 102, an output device 104, and a user input device 106. Further, this environment includes a communications medium 108 and multiple content providers 110*a-n*. The elements of FIG. 1 may be implemented in any combination of hardware and/or software.

As shown in FIG. 1, media platform 102 includes a processing module 112 and storage media 114. Processing module 112 may include one or more processors (e.g., microprocessors). Such processors may include a central processing unit (CPU) and/or a graphics processing unit (GPU). Such processors may be single core or multi-core processors.

Storage media 114 may include control logic or instructions (e.g., software) that may be executed by processing module 112. The execution of such instructions may provide various features, as described herein. Additionally or alternatively, storage media 114 may store information in the form of content items. Such content items may include video, audio, games, messages, documents, and/or application files (e.g., word processing documents, spreadsheets, etc.). Embodiments, however, are not limited to these examples. FIG. 1 shows storage media 114 being within media platform. However, storage media 114 may also include media within a device that is connected (e.g., docked) to media platform 102 through a wired or wireless interface. Examples of such devices include (but are not limited to) media players (e.g., handheld media players), wireless phones, jump storage drives (e.g., universal serial bus flash drives), computers, personal digital assistants (PDAs), and so forth. Exemplary interfaces for such devices include (but are not limited to) serial or parallel interfaces, short-range wireless connections (e.g., Bluetooth), wireless local area network interfaces, the Internet, and so forth.

In embodiments, media platform 102 may receive content items from various external sources. For example, content items may be received from content providers 110a-n through communications medium 108. Content provider 110a-n may include various sources of information. Exemplary sources include (but are not limited to) television broadcasters, servers (e.g., web servers, media servers, e-mail servers, etc.), and peer-to-peer networking sources.

Communications medium 108 may include (but is not limited to) any combination of wired and/or wireless resources. For example, communications medium 210 may include resources provided by any combination of cable television networks, direct video broadcasting networks, satellite networks, cellular networks, wired telephony networks, wireless data networks, the Internet, and so forth.

Output device 104 may be of various device types that provide visual and/or audiovisual output to one or more users. For example, in embodiments, output device 102 may be a television, a video display, a personal computer, or other suitable device. Embodiments, however, are not limited to these examples.

User input device 106 allows users to interact with the environment of FIG. 1. For instance, user input device 106 may allow users to select various content items for outputting through output device 104. Additionally or alternatively, user input device 106 may allow users to direct the manner in which such content is output (e.g., by manipulating one or more graphical interface elements). User input interface 106 may include one or more devices. Examples of such devices include (but are not limited to) keypads, keyboards, and touchscreens (e.g., implemented through output device 104), handheld remote controls, and gesture-based controls.

Media platform 102 processes content (e.g., content received through communications medium 108 and/or content stored within storage media 114). This may involve providing content and/or information regarding such content through various user interface elements. As described herein, exemplary content includes (but is not limited to) video, audio, television, games, messages, documents, and/or application files (e.g., word processing documents, spreadsheets, etc.).

The elements of FIG. 1 may be allocated among one or more devices. For example, media platform 102, output device 104, and user input device 106 may be included in a device, such as a television, a personal computer, or a handheld device. Alternatively, media platform 102 may be included in a device, such as a set-top box, that is separate from output device 104 and/or user interface 106. Embodiments, however, are not limited to these examples.

Embodiments provide mechanisms for identifying the right types of content that appeal to a user from multiple software frameworks and/or content sources. This content is then presented to the user in an integrated user interface (UI) layer. These mechanisms identify and pull (collate) content from different sources, and render the collated content for the user through various UI tools.

Figure 2:
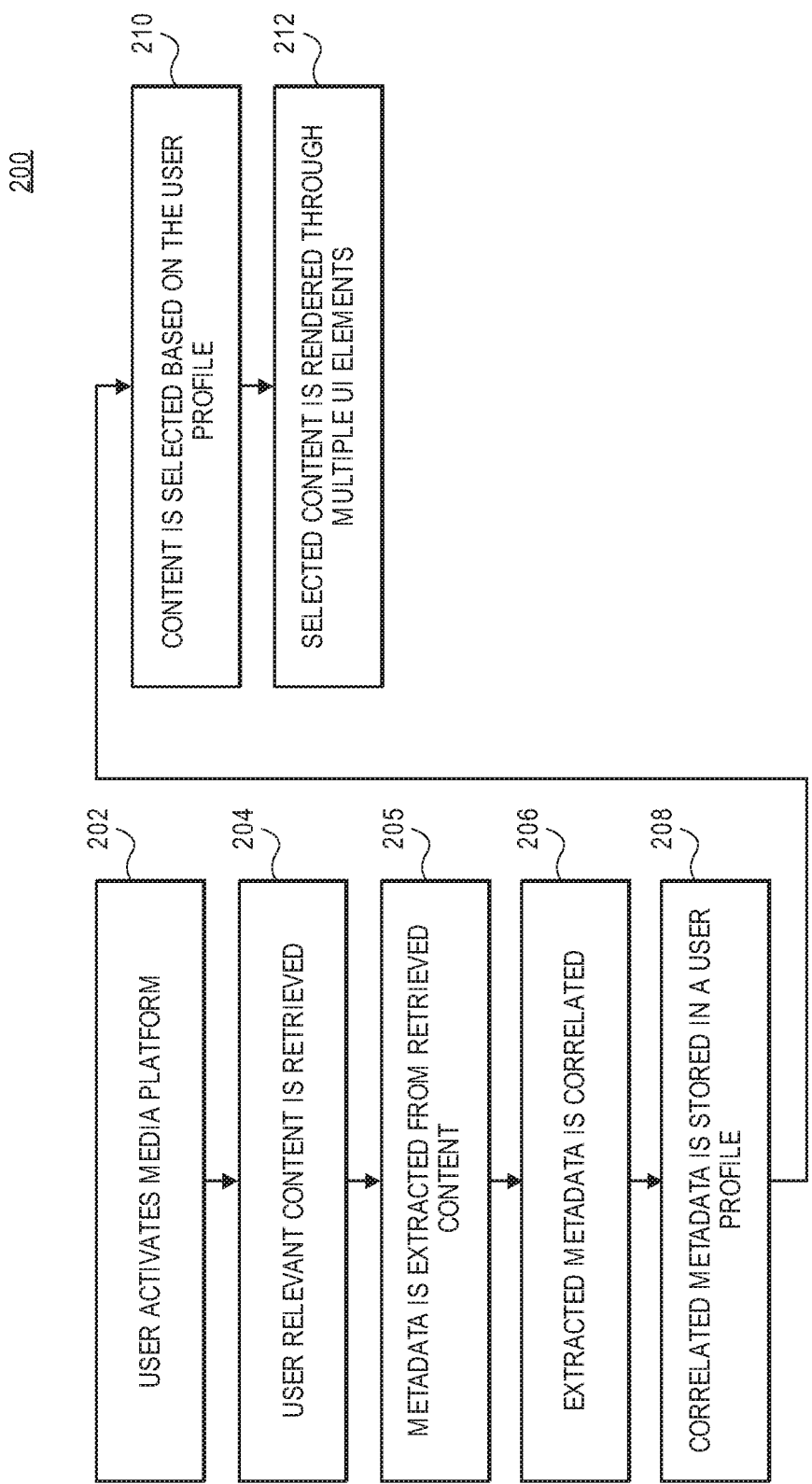
FIG. 2 is a logic flow diagram.

FIG. 2 illustrates an exemplary logic flow 200, which may be representative of operations executed by one or more embodiments described herein. Thus, this flow may be employed in the contexts of FIG. 1. Embodiments, however, are not limited to this context. Also, although FIG. 2 shows particular sequences, other sequences may be employed. Moreover, the depicted operations may be performed in various parallel and/or sequential combinations.

At a block 202, a user activates a media platform (e.g., media platform 102). For example, this may comprise applying operational power to the media platform.

At a block 204, user relevant content is retrieved from applications, devices and frameworks that have been previously used by the user. In embodiments, such content (data) may be cached and archived. This may advantageously make such retrievals faster. For such caching and archiving, the user can select to maintain the security of personal information by establishing settings that store data locally with essential security features.

This may involve retrieving content at various sources (e.g., sources within the media platform and/or sources external to the media platform). Exemplary sources include (but are not limited to) favorites, bookmarks, recorded content (e.g., content recorded on a digital video recorder (DVR)), tagged content, history, data from networked devices used by the user, and social networks.

At a block 205, metadata is extracted from such content. Such metadata may include information derived from within the content. Examples of such information may include themes, performers, type of content (adult oriented, children oriented, family oriented, etc.), length of the content, and/or text contained within the content (e.g., text within word processing documents). Embodiments are not limited to these examples. This extraction of metadata may include performing one or more analysis operations on the content. Exemplary analysis operations include one or more of image pattern recognition (e.g., object identification), text analysis, and so forth.

Additionally, block 205 may comprise retrieving metadata that is stored in correspondence with the content. Such stored metadata may include information regarding the corresponding content, as well as information pertaining to the circumstances in which it has been previously consumed. For example, the metadata may describe when the content was consumed, who consumed it, what other content or applications were concurrently active with this consumption, content genre, content ratings, and so forth. Embodiments are not limited to these examples.

At a block 206, this extracted and/or retrieved metadata is correlated. This may involve creating one or more vectors, in which each vector includes information that pertains to a particular type of consumption circumstance. This information may include, for example, content identifiers, content metadata, and/or content source identifiers. Embodiments, however, are not limited to these examples.

For example a vector may include information pertaining to consumption times. Another vector may include information pertaining to content types (e.g., live television, recorded video, games, word processing, e-mail, etc.). A further vector may include information pertaining to persons consuming content (e.g., the user alone, the user's family, the user's friends, etc.) These vectors are provided for purposes of illustration, and not limitation. Accordingly, any combination of vectors may be employed.

The information in each vector may be indexed according to vector values. For example, in a vector pertaining to consumption times, information within the vector may correspond to one or more time values. As another example, in a vector pertaining to content types, information within the vector may correspond to one or more content types. As yet a further example, in a vector pertaining to persons consuming content, information within the vector may correspond to one or more group values (e.g., alone, with family, with buddies, etc.). These examples are provided for purposes of illustration, and not limitation.

At a block 208, this correlated metadata is stored in a user profile. The user profile describes the user's content consumption characteristics. FIG. 2 shows that, at a block 210, content based on the user profile is selected. This may involve determining current circumstances, and selecting corresponding content from the user profile.

For instance, in the exemplary user profile described above, block 210 may comprise searching one or more vectors based on the current circumstances. For instance, the current time (e.g., portion of the day, day of the week, etc.) may be used to search a consumption time vector for corresponding content consumption information. Similarly, an already open content item (e.g., TV program, video selection, text selection, etc.) may be used to search a concurrent consumption vector for information regarding content items that are commonly consumed alongside the currently open item. In embodiments, the results of such searching may be further refined or pared down (e.g., duplicates removed, etc.).

At a block 212, the selected content is rendered through multiple UI elements. For instance, embodiments may provide multiple UI elements, which are described in greater detail below. In embodiments, these UI elements may include a carousel, a preview stack, an add-to-favorites button, and a My Channel UI. These UI elements, and their underlying mechanisms, may advantageously help unify the user's experience across any set of disparate software frameworks.

In FIG. 2, blocks 202-212 may be performed repeatedly. Thus, a loop is established in which the profile may be repeatedly developed. This advantageously provides for rich machine learning and rich definition of the profile over time as the user's patterns increase with multi-platform use. As a result, the ability to learn the user's preference for content is incrementally improved.

As described above, embodiments may render content through a carousel (e.g., a three dimensional carousel). The carousel provides renderings from multiple content sources. These renderings may be arranged in a rotary manner. This rotary manner may show only a portion of the renderings at a time (e.g., in a vertical alignment). However, the carousel may be navigated (e.g., "scrolled" or "spun") to reveal other renderings. Thus, the content renderings may be arranged in a loop. Depending on the number of renderings, only some may be visible at a particular moment in time. The renderings provided by the carousel may comprise text, images, live video (e.g., with thumbnails) or live previews with real time rendering as user scrolls.

In embodiments, the carousel automatically starts rendering with content sources that are commonly used by the user. With reference to FIG. 2, such content sources may be obtained from the user profile stored at block 208. Additionally, such content sources may be obtained from stored favorites, stored bookmarks, as well as from other sources.

Examples of content sources include (but are not limited to) websites, applications, file storage directories, and other sources of content. For instance, the carousel may indicate content sources, such as Facebook, Twitter, Skype, iTunes, My DVR, My PC, and so forth.

As a result, the carousel may operate as a primary point of navigation for a user when navigating content across different stacks of content sources. More particularly, the carousel provides access to various content sources (e.g., websites, applications, device names, documents, etc.) as the user desires. For instance, by activating a particular carousel entry, it may receive a larger rendering. Based on user selection, such a larger rendering may be a full screen rendering or a dedicated window rendering.

Once an initial setup (rendering) of the carousel occurs, the user may manually customize it. For instance, the user may delete items from the carousel, add new ones to it, or change the order that items are arranged on the carousel.

Figure 3:
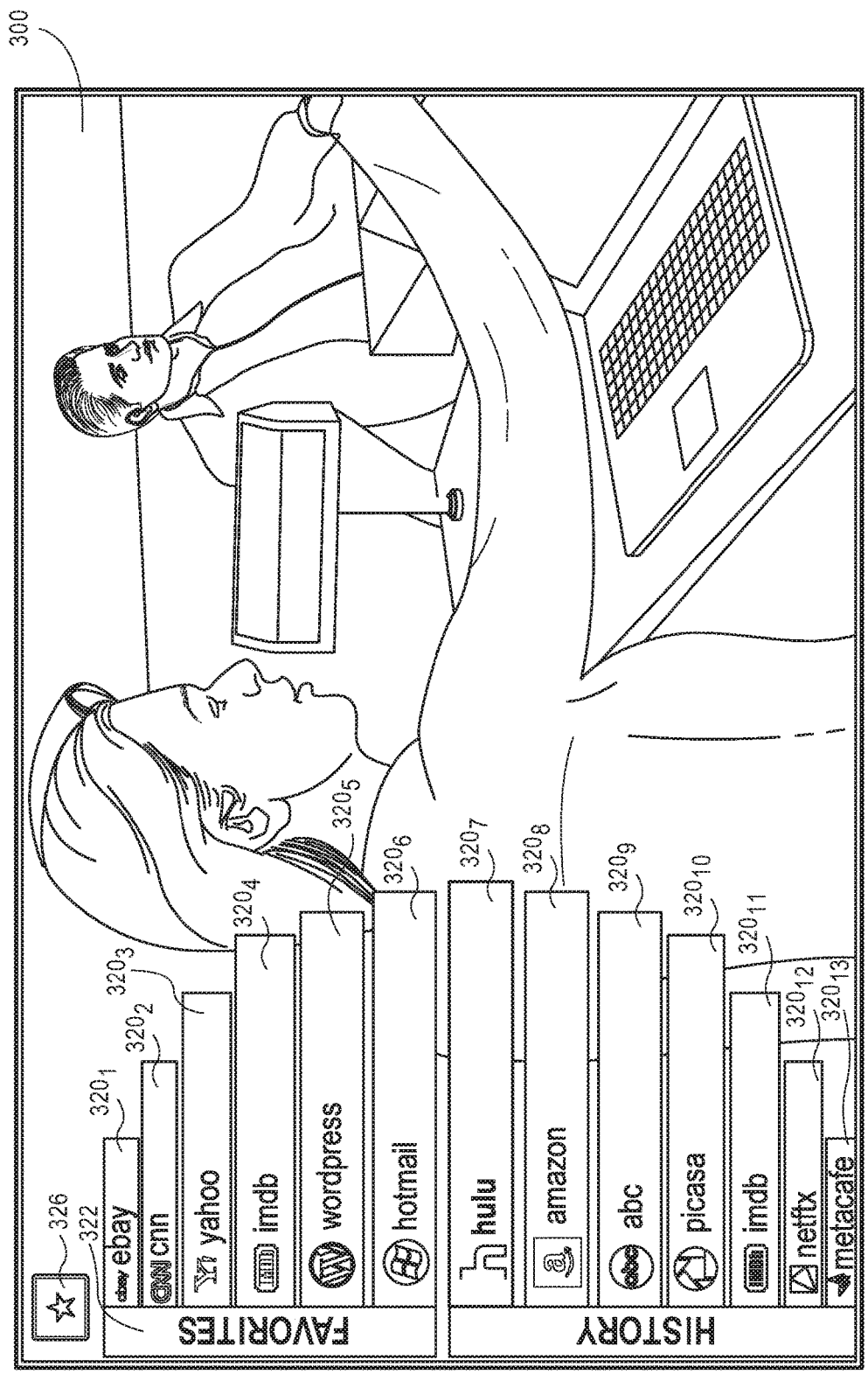
FIGS. 3-5 are exemplary user interface views.

FIG. 3 is a view of an exemplary carousel within a viewing area 300. As shown in FIG. 3, the carousel includes multiple renderings $320_1$-$320_{13}$. As described above, such renderings are arranged in a rotary manner. Thus, the carousel may include further elements that are not shown. However, a user may (through interaction with an input device) cause the carousel to rotate and bring these obscured elements within view.

FIG. 3 shows an image substantially encompassing viewing area 300. This image corresponds to a main content item (e.g., a video item) that is currently being rendered. In embodiments, a user may select (through interaction with an input device) one of the elements from the carousel (e.g., one of items $320_1$-$320_{13}$) to be rendered as the main item.

Additionally, FIG. 3 shows a view favorites button 322. In embodiments, a user may activate view favorites button 322 to reveal a listing of content items that the user has selected as favorites.

Such selections may be made through the employment of an add-to-favorites button. This feature may be a graphical icon or button that is displayed at all (or most) times. For instance, the add-to-favorites button may be displayed to overlay a video image. Alternatively, the add-to-favorites button may be outside of the video image region (e.g., in an address bar).

During operation, a user may select the add-to-favorites button (e.g., click on it) to add whatever they are currently viewing to their list of favorites. When this occurs, the content may be also automatically added to the Carousel and the My Channel section. As an example, FIG. 3 shows an add-to-favorites button 326.

FIG. 3 further shows a view history button 324. When a user selects this button, a listing of previously outputted content items is provided. This listing may be in chronological order. However, various forms of presentation may be employed. Thus, through such features, user preferences and patterns may be collated across different frameworks.

As described above, embodiments may render content through a preview stack (e.g., a preview stack). Such a preview stack provides a mechanism for the user to navigate through windows. For instance, in embodiments, every time the user opens a new application, a website, or a document, it is added to the preview stack. It is common for users to leave their windows open. Thus, the stack advantageously allows organized navigation through open windows. The stack provides an instant preview of open content on each window, which could be a TV channel, a website, an application, or any other type of content. As a result, the stack becomes a metaphor to showcase a media wall with multiple streams of content at the same time. In embodiments, the stack provides real time rendering of content open from its respective sources. In embodiments, the preview stack may also be used to display search results visually.

Visually, the preview stack may comprise multiple graphical elements (e.g., panes, panels, and/or windows) that are arranged in a layered manner. Each of these graphical elements corresponds to a particular content item (e.g., video, website, application, etc.). As described above, the each element may include a rendering (e.g., a preview or a full rendering) of its corresponding content item.

In embodiments, the user may navigate through each element in the preview stack. Such navigation may be through interaction with a user interface device.

Figure 4:
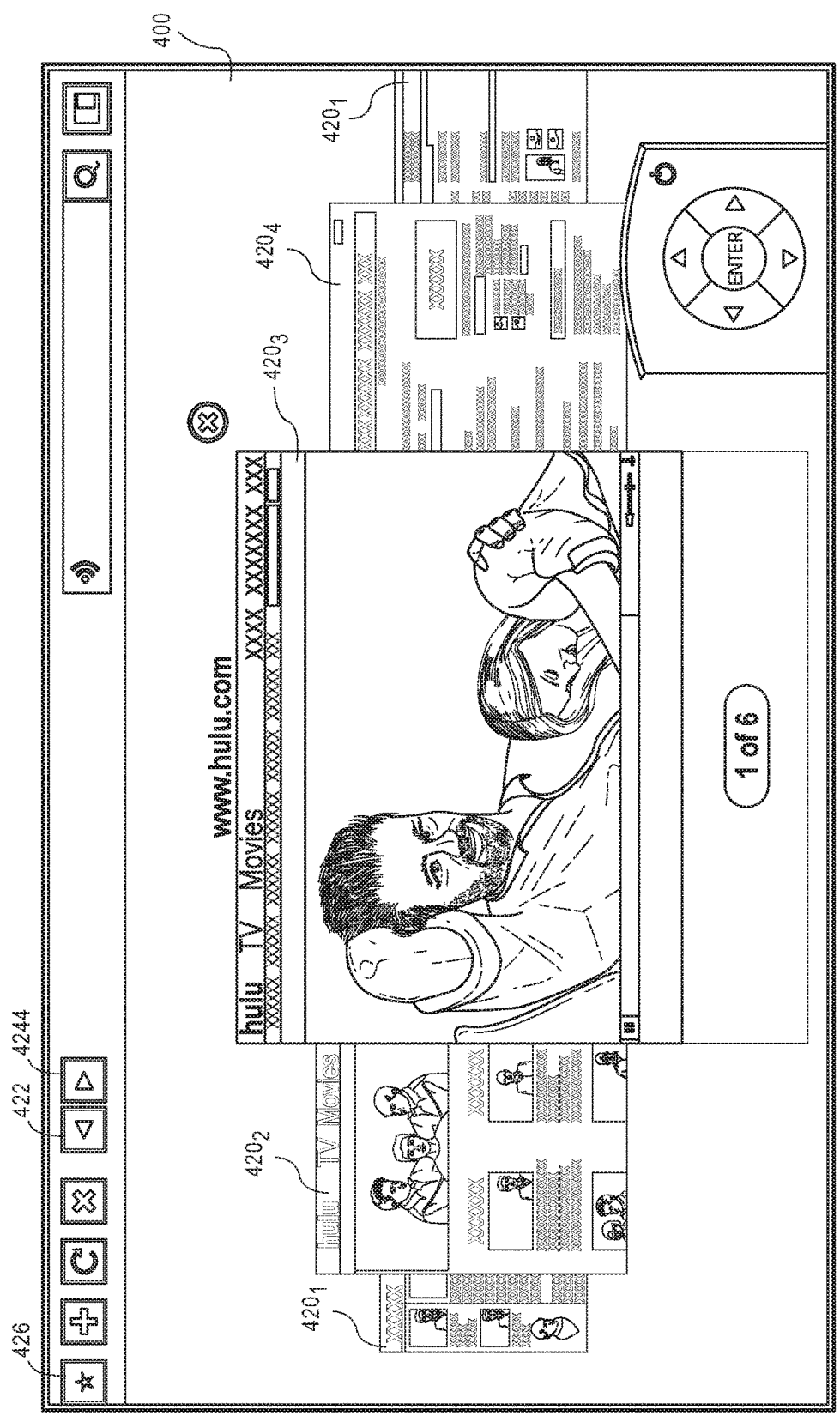

FIG. 4 is a view of an exemplary preview stack within a viewing area 400. As shown in FIG. 4, the preview stack includes multiple renderings $420_1$-$420_6$. A user may navigate among these elements through various techniques. For instance, FIG. 4 shows buttons 422 and 424, which allow for bidirectional navigation through these elements. Also, FIG. 4 shows an add-to-favorites button 426. As described above, this button allows for content that is currently being viewed to be added to the user's list of favorites.

As described above, embodiments may render content through a My Channel UI. The My Channel UI may allow a user to create his/her own channel in a personalized UI space. For instance, the My Channel UI may provide a graphical element (e.g., a pane, panel, or window) that contains multiple content opportunities, as selected by the user. These content opportunities may be the actual content. Alternatively, these content opportunities may be activatable elements (e.g., buttons, links, etc.) that launch the corresponding content.

The users may drag and drop content from the carousel and/or the preview stack into the My Channel UI. Additionally or alternatively, the My Channel UI may include content searching features, that allow a user to search for particular content (e.g., through the use of queries, keywords, profiles, related content, etc.) Upon the retrieval of search results, the user may select from content indicated by the results, and insert the selections into the My Channel UI.

Further, the My Channel UI may also display recommendations of content. In embodiments, such recommendations are based at least on of content opportunities that are currently within the My Channel UI.

As a result, the My Channel UI becomes a homepage, where users may navigate when they want to view content relevant to their personal tastes. The My Channel feature essentially becomes a user's personalized portal for accessing content they please from across any application.

Figure 5:
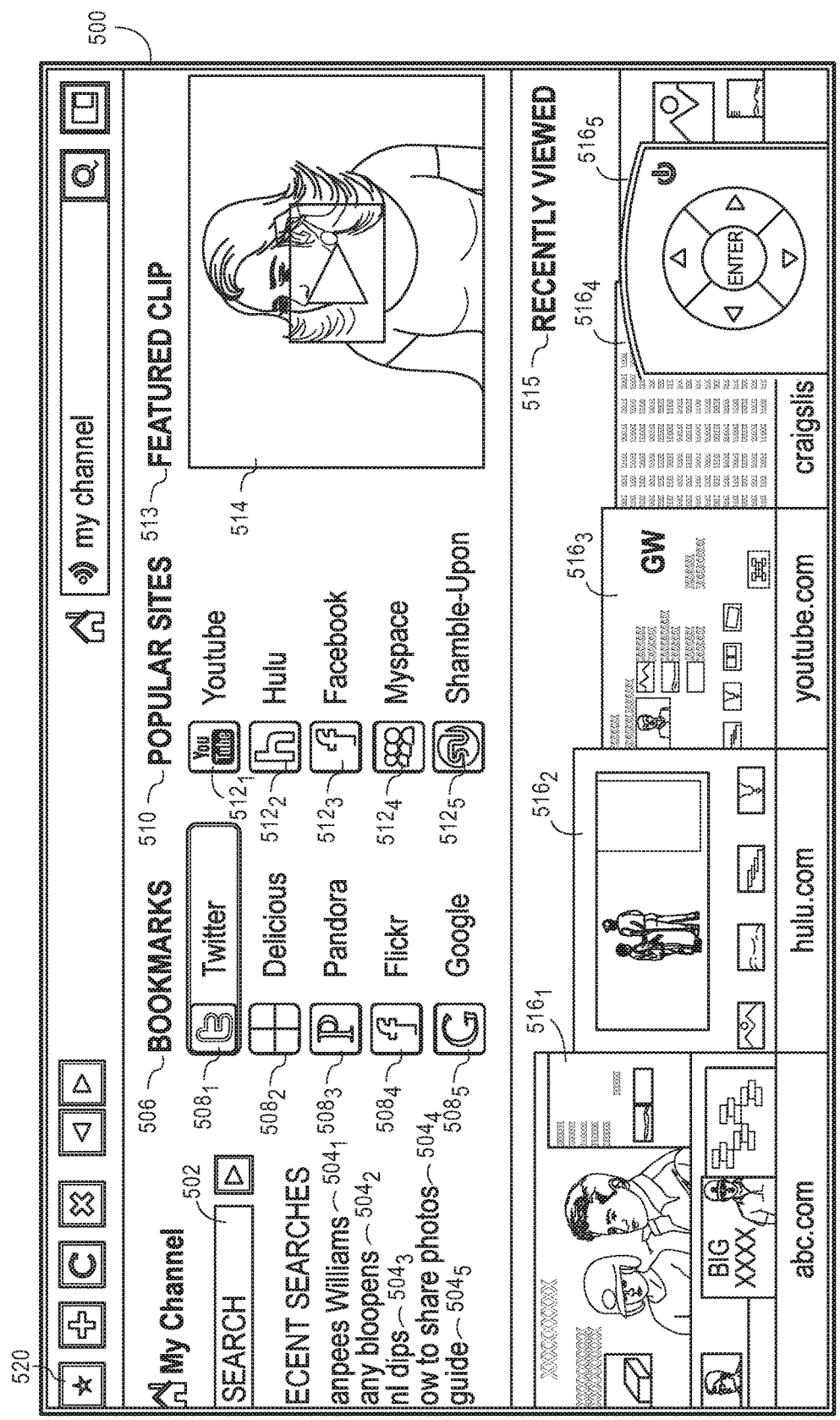

FIG. 5 is a view of an exemplary My Channel UI within a viewing space 500.

This view shows the My Channel UI having various portions. For instance, FIG. 5 shows a search interface portion 502, a bookmarks portion 506, a popular sites portion 510, a featured clip portion 513, and recently viewed portion 515. These portions are shown for purposes of illustration, and not limitation.

Search interface portion 502 allows a user to perform searches for content. Such searching may be based on the input of one or more search terms. In turn, the media platform may perform a search across multiple content types, sources, applications, and/or frameworks. In addition, the My Channel UI includes a listing of recent searches $504_1$-$504_5$. Selecting any of these recent searches will reveal corresponding results.

Bookmarks section 506 provides a listing of bookmark categories $508_1$-$508_5$. As shown in FIG. 5, each of categories $508_1$-$508_5$ corresponds to a particular content provider (e.g., Twitter, Delicious, Pandora, Flickr, and Google).

A popular sites section 510 provides a listing of sites (e.g., websites) $512_1$-$512_5$ that have are popular with the user. In embodiments, these sites may be automatically determined through the operations described above with reference to FIG. 2.

Featured clip section 513 includes a region in which a featured video 514 is outputted. This feature video may be selected through techniques described herein. For instance, a platform may automatically select featured video 514 based at least on a user profile. Recently viewed portion 515 provides renderings $516_1$-$516_5$ of content that has recently been viewed by the user. Such renderings may be in various forms, such as snapshots, video clips, image sequences, and so forth.

As in FIGS. 3 and 4, the interface of FIG. 5 includes an add-to-favorites button (shown as button 520).

As described above, FIGS. 3-5 provide exemplary views of user interface elements. However, these examples are provided for purposes of illustration, and not limitation. Thus, other arrangements of such user interface elements may be employed.

Figure 6:
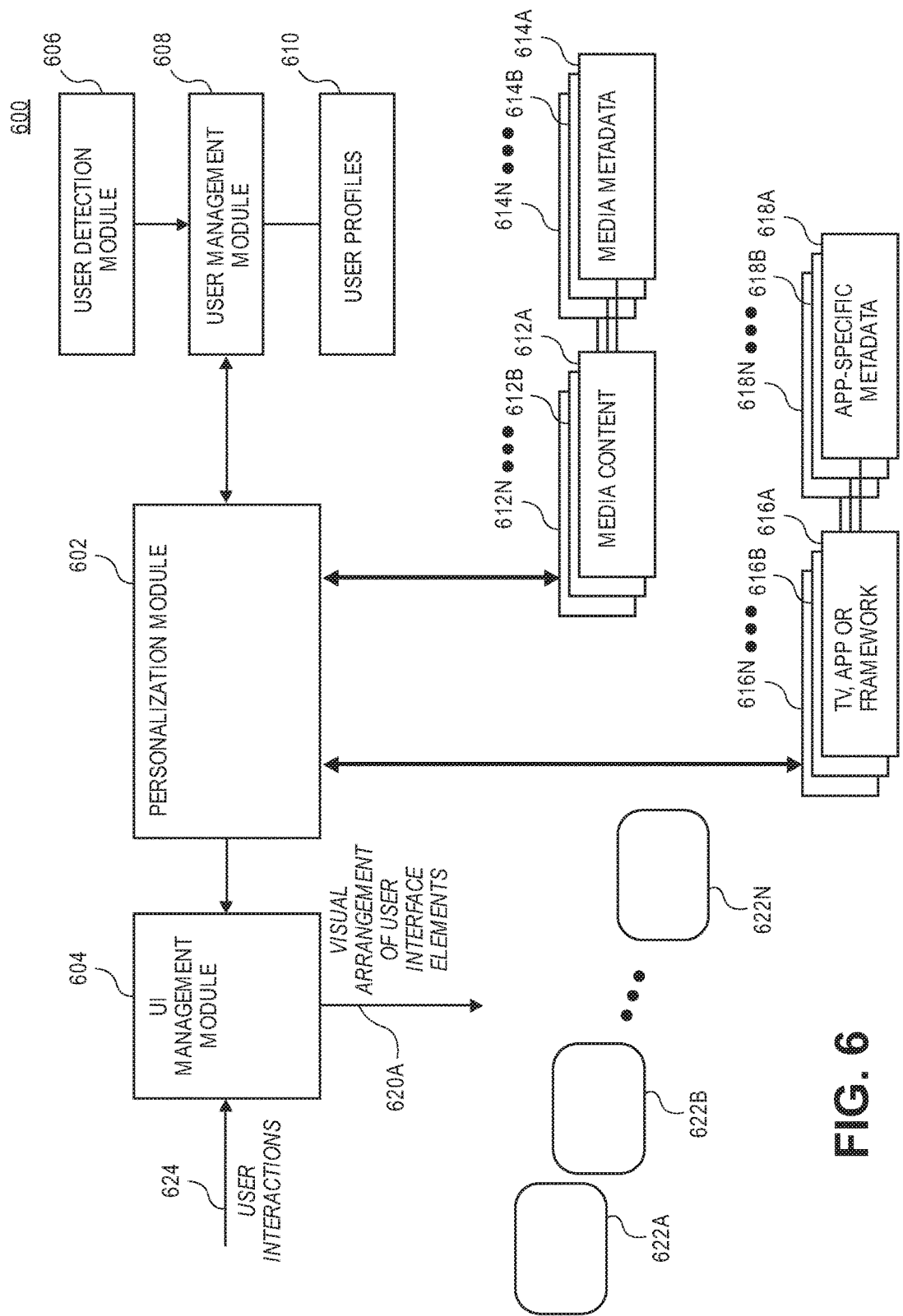
FIG. 6 is a diagram of an exemplary implementation.

FIG. 6 is a diagram of an exemplary implementation 600 that may employ the techniques described herein. Implementation 600 includes a personalization module 602, a UI management module 604, a user detection module 606, and a user management module 608. These elements may be implemented in any combination of hardware and/or software. In embodiments, implementation 600 may be included in a media platform device, such as media platform 102. Embodiments, however, are not limited to this context.

Further, implementation 600 may maintain various forms of information. For example, FIG. 6 shows implementation 600 storing multiple media content items 612a-n. Also, implementation 600 may store corresponding media metadata 614a-n. Each of content items 612a-n may be associated with various applications and/or services.

Examples of applications/services include (but are not limited to) video content, audio content, personal computing applications (e.g., word processing documents, spreadsheets, presentation documents, etc.), web content (e.g., web pages).

Media metadata 614a-n provides information regarding corresponding content items 612a-n. For example, media metadata 612a-n may include descriptive information, such as title, genre, length, plot summary, ratings, reviews, and so forth. However, embodiments may employ any type of metadata. Implementation 600 may receive such metadata with corresponding content items 612a-n. Alternatively or additionally, a user of implementation 600 may create and store metadata 614a-n. Such user-originated metadata may be supplemental to preexisting metadata.

Such video content may be received from various sources. For example, video content may be received from television broadcasts. Alternatively or additionally, such video content may be downloaded from internet sources (e.g., websites, streaming servers, etc.). Also, such video content may be received through tangible media (e.g., DVD discs, Blue-ray discs, magnetic storage media, electronic storage media, etc.).

Content items 612a-n and media metadata 614a-n may be locally stored. For example, in the context of FIG. 1, such storage may be within storage media 114.

Additionally or alternatively, such storage may be provided by one or more remote devices (e.g., remote server(s)).

Implementation 600 may also provide multiple applications and/or application frameworks 616a-n. Examples of applications include (but are not limited to) television tuners, web browsers, media players, games, e-mail applications, word processing applications, spreadsheet applications, and so forth.

An application framework may be a set of one or more applications associated with (or provided by) a particular content provider or equipment provider (e.g., an original equipment manufacturer (OEM)). For example, a framework may include one or more applications associated with a television provider. Such applications may include (but are not limited to) a television viewing application, an electronic programming guide (EPG), and/or a digital video recorder (DVR) management application.

Applications/application frameworks 616a-n may be implemented in any combination of hardware and/or software. For example, one or more of such applications may comprise control logic or instructions (e.g., software) stored in a storage medium. Such a storage medium may be local (e.g., within storage media 114) or remote. A processing unit (e.g., processing module 112) may execute such control logic to provide the corresponding applications.

FIG. 6 shows that application metadata 618a-n corresponds to applications/application frameworks 616a-n. Application metadata 618a-n may provide information regarding the corresponding applications/application frameworks. For example, such metadata may describe an application type (e.g., media related, game, video, audio, television, personal computing, etc.) Additionally or alternatively, such metadata may describe usage characteristics of the corresponding applications. Such usage characteristics may include user(s) who use the application, times applications are used. Embodiments, however, are not limited to these examples. Application metadata 618 may be stored locally (e.g., within storage media 114) or remotely.

User profiles 610 are stored for each user of implementation 600. Each of these profiles includes information regarding a user's usage characteristics. For example, such information may include demographic information regarding the user, information regarding the user's preferences, and/or usage information pertaining to the user.

For instance, as described herein, such user profiles may comprise one or more vectors, where each vector includes information (e.g., content consumption events) pertaining a particular type of consumption circumstance. In embodiments, user profiles 610 may be stored locally (e.g., within storage media 114). Alternatively, they may be stored remotely.

In embodiments, user management module 608 generates user profiles 610. This generation may be in accordance with the techniques described herein. For instance, user management module 608 may retrieve and analyze information regarding user content consumption. User profiles 610 may be based at least on such retrieval and analysis.

User detection module 606 detects the presence of a person currently operating implementation 600. This may be based on one or more user interactions. Exemplary interactions include a login procedure. Alternatively, this person detection may be automatic, for example, through the employment of one or more sensors (e.g., one or more cameras) and various pattern recognition mechanisms. Further, such detection techniques may be employed to recognize multiple concurrent users.

Personalization module 602 selects content that is to be rendered through multiple UI elements. As described above, such UI elements may include a carousel, a preview stack, and a MyChannel UI. This selection may be based at least on information received from user management module 608.

Further, personalization module 602 operates as an intermediary between user management module 608 and stored information (e.g., media content 612a-n, media metadata 614a-n, applications/frameworks 616a-n, and metadata 618a-n). For instance, personalization module 602 may search and/or extract information from these elements. In turn, such information may be refined and forwarded to user management module 608. UI management module 604 manages user interface operations. For example, UI management module 604 generates a graphical interface on an output device (e.g., output device 104 of FIG. 1). This graphical interface may include multiple user interface elements 622a-622n. Examples of such user interface elements include a carousel, a preview stack, an add-to-favorites button, and a My Channel UI. Additionally or alternatively, such user interface elements may include windows, panes, or panels that output particular content. Also, such user interface elements may include a full screen content rendering. Embodiments, however, are not limited to these examples.

In addition, UI management module 604 receives user inputs from one or more user input devices (e.g., user input device 106 of FIG. 1). These user inputs may select and/or manipulate user interface elements 622a-622n. Moreover, these user inputs may control operation of content delivered by these user interface elements.

As described herein, embodiments may intelligently mix content types (e.g., Internet content mixed with broadcast and personal content). Further, embodiments may provide intuitive controls and navigational tools that advantageously allow users to easily move between pages and windows of content. Moreover, such controls and tools may allow users to easily interact with related pieces of content from across different sources in an integrated fashion.

For instance, embodiments may provide a "trick mode" for media manipulation. This trick mode provides a zoom feature that is an enhancement over conventional zoom tools. With this zoom feature, zooming is more than merely increasing and/or decreasing the size of content. Rather, this zoom feature allows a user to navigate in and out of content. As a result, a user is given control over how much content he/she wishes to access at any given point.

For instance, this zoom feature allows a user to decide whether he/she wants to view multiple content windows at a very high preview level or dive deep into one single piece of content at a detailed level exposing metadata related to it.

As an example, when a user zooms out beyond 100%, he/she can see multiple windows of content they have left open at some point on their display device (e.g., their TV screen). These multiple windows may display visual previews of their corresponding content. Examples of such content may include (but are not limited to) websites, DVR content, videos, photos from a home network, paused TV channels, applications (e.g., Skype, iTunes, etc.) that are left open. Thus, content can be showcased in real time allowing users to view the most current view of the content.

However, when a user zooms in beyond 100% on a content item (e.g., a video in a webpage), the user may zoom into an object that is displayed by the content item. For example, a user may zoom into a person shown by the content item. When this occurs, embodiments may provide the user with content related to the object.

For instance, using the example of a televised sporting event, the user may zoom in on a particular coach or player. In turn, specific information regarding the coach or player (coach/player history, stats, highlights, etc.) may be automatically provided. As a further example, a user may zoom into a particular aspect of a video (e.g., a 3D video) to provide a unique camera-angle/view into whatever is being watched.

Figure 7:
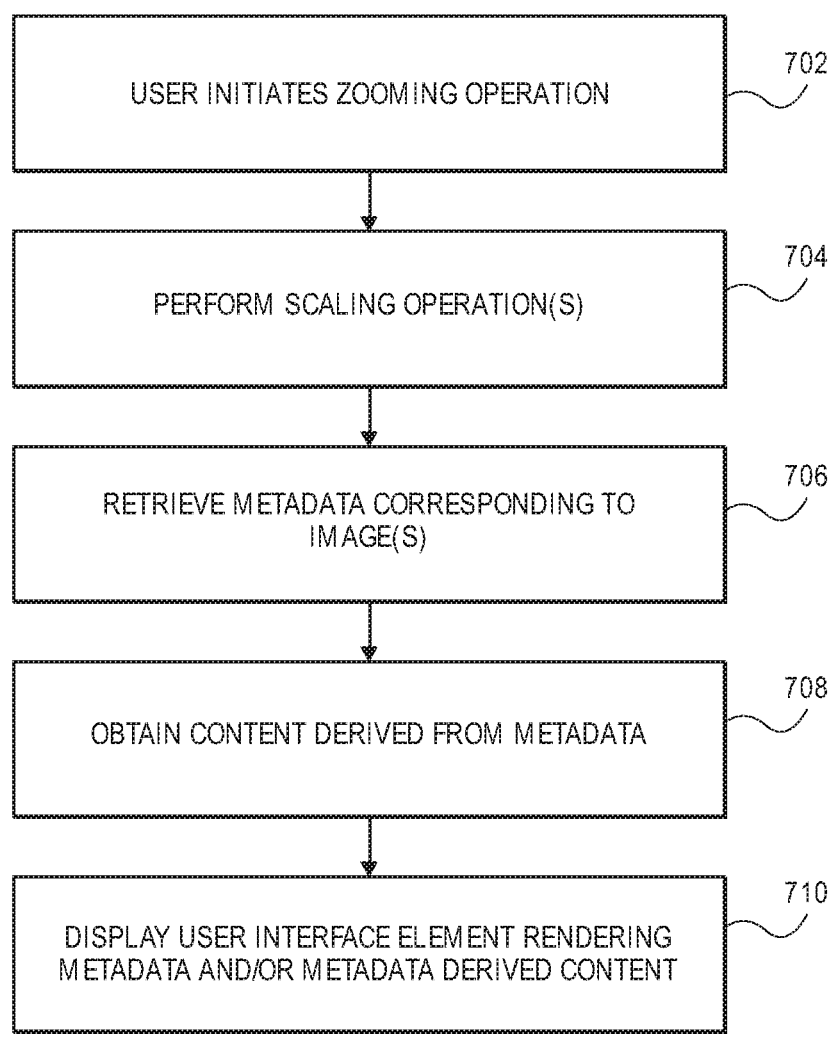
FIG. 7 is a logic flow diagram.

FIG. 7 illustrates an exemplary logic flow 700, which may be representative of operations executed by one or more embodiments described herein. Thus, this flow may be employed in the context of FIG. 1. Embodiments, however, are not limited to this context. Also, although FIG. 7 shows particular sequences, other sequences may be employed. Moreover, the depicted operations may be performed in various parallel and/or sequential combinations.

At a block 702, a user initiates a zooming operation. This operation may involve the user specifying one or more zooming characteristics. Such characteristics may include an amount of zoom (e.g., a degree of magnification), and a position of the corresponding view. For example, when zooming in, this position may indicate a position within a viewing space provided by an output device.

Based on these characteristics, corresponding scaling operations are performed at a block 704. This scaling yields image(s) at a level of detail selected by the user.

At a block 706, metadata corresponding to these image(s) is retrieved. In embodiments, this metadata may be descriptive of objects shown in the image(s). For example, the metadata may include names of persons and/or places shown in the image(s), and/or content related to such objects. Further, at a block 707, content derived from the metadata may be obtained. This may comprise automatically performing a search (e.g., through a web search engine) using the metadata. Embodiments, however, are not limited to this example.

Blocks 706 and/or 707 may be performed locally (e.g., at the user's media platform) or remotely (e.g., by the content or service provider). Thus, in embodiments, metadata and/or metadata-derived content may be transmitted along with the corresponding content. In this case, the metadata/metadata-derived content may be indexed according to portions/positions within the content to allow for retrieval through zooming in.

However, when performed locally, the user's media platform may search for recognizable objects (persons, places, animals, text, etc.) within the zoomed in portion(s) of the content. This may involve employing one or more image processing and/or pattern recognition techniques. Such techniques may extract objects and compare features of such extracted objects with a database (maintained locally or remotely) of predetermined features. Upon the recognition of objects, corresponding metadata may be retrieved (e.g., from a local source or a remote source).

Based on this metadata, a user interface element (e.g., a window) is displayed at a block 708. This user interface element may be, for example, on top of or next to the content being zoomed in. This user interface element renders the metadata and/or metadata derived content.

The operations of FIG. 7 may be performed repeatedly. Thus, embodiments may continually be parsing through content being watched constantly, looking for metadata and information in the background, caching it and buffering it. Thus, information can be dumped in and out of cache storage. As a result, real time access to contextual content may be obtained. Further, embodiments may learn from usage patterns of zooming to intelligent cache and buffer relevant metadata based on user profile and history.

Figure 8:
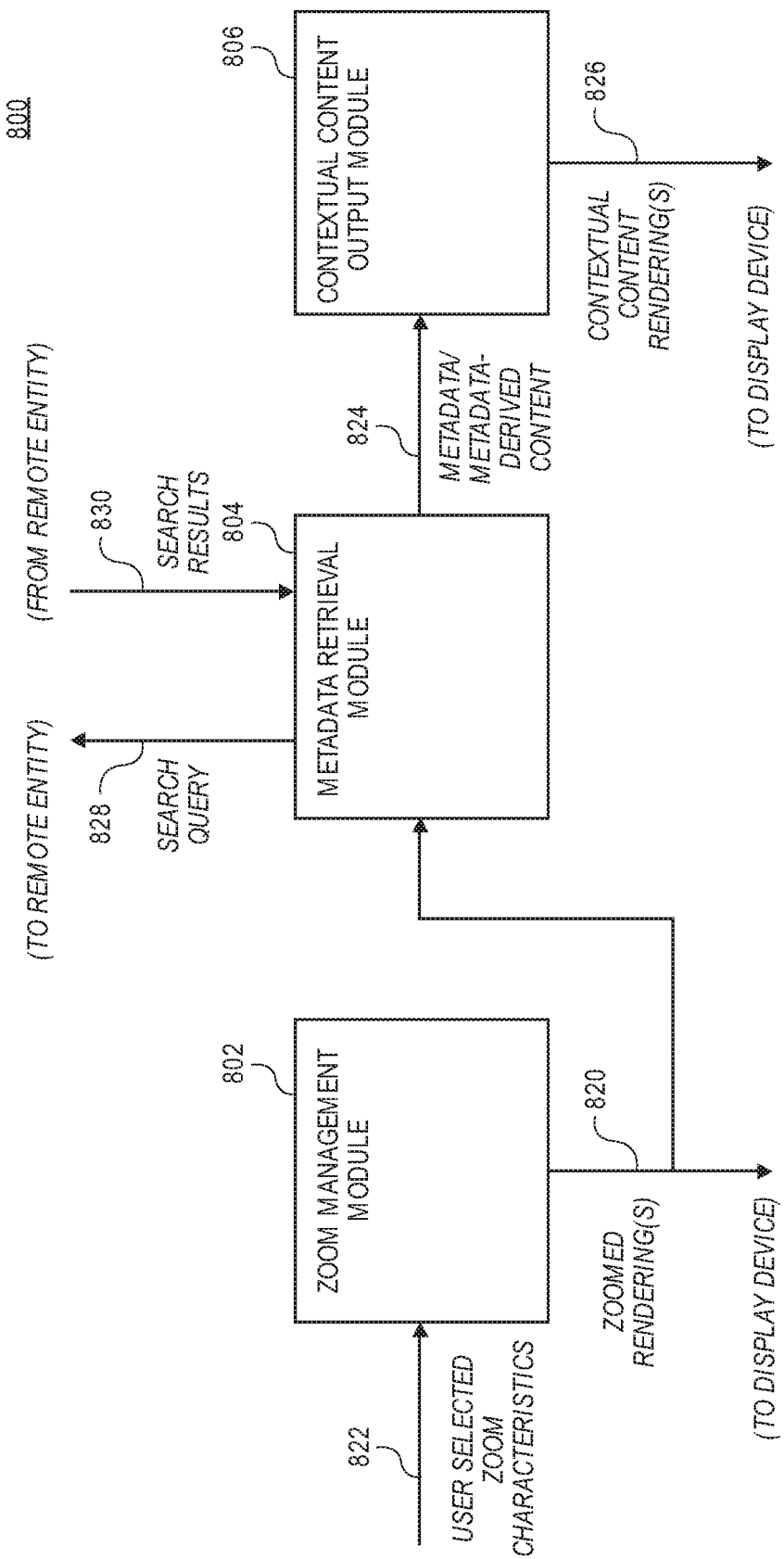
FIG. 8 is a diagram of an exemplary implementation.

FIG. 8 is a diagram of an exemplary implementation 800 that may employ zooming techniques, as described herein. Implementation 600 includes a zoom management module 802, a metadata retrieval module 804, and a contextual content output module 806. These elements may be implemented in any combination of hardware and/or software. In embodiments, implementation 800 may be included in a media platform device, such as media platform 102. Embodiments, however, are limited to this context.

Zoom management module 802 performs user interface operations involving zooming in and zooming out. For instance, zoom management module 802 generates zoomed renderings 820 based on user selected zoom characteristics 822. In the context of FIG. 1, a user may input these characteristics through user input device 106.

FIG. 8 shows that renderings 820 are sent to a display device (e.g., output device 104 of FIG. 1). These renderings may be of one or more content items. For example, when a zoomed out selection is made, every open content item may be displayed. In contrast, when a zoomed in selection is made, the rendering may include only a portion of a particular content item.

As shown in FIG. 8, metadata retrieval module 804 may receive display renderings 820. Alternatively or additionally, metadata retrieval module 804 may receive information regarding the current zoom settings. In turn, metadata retrieval module 804 obtains metadata corresponding to the current zoomed rendering(s) (e.g., corresponding to what is currently being displayed).

As described above, obtaining metadata may involve metadata retrieval module 804 accessing metadata that was delivered with the corresponding content item(s). For example, in the context of FIG. 6, such metadata may include media metadata 614a-614n. In embodiments, such metadata may be indexed according to portions/locations of their content items.

Alternatively or additionally, metadata retrieval module 804 may search for recognizable objects within the zoomed in portion(s) of the content item. As described herein, this may involve metadata retrieval module 804 employing one or more image processing and/or pattern recognition techniques. Upon the recognition of objects, metadata retrieval module 804 may obtain corresponding metadata (e.g., from a local source or a remote source).

Further, metadata retrieval module 804 may obtain content derived from such metadata. This may involve performing one or more searches (e.g., web searches) from remote sources. For instance, FIG. 8 shows metadata retrieval module 804 transmitting a search query 828 and receiving corresponding search results 830 (which may provide metadata-derived content).

In turn, FIG. 8 shows metadata retrieval module 804 sending such metadata and/or metadata-derived content 824 to contextual content output module 806. Based on this, contextual content output module 806 generates contextual content rendering(s) 826, which are sent to the display device.

The elements of FIG. 8 may be included in various contexts. For instance, these elements may be included within the implementation of FIG. 6. As an example, these elements may be implemented within UI management module 604. Embodiments, however, are not limited to this example.

Figure 9:
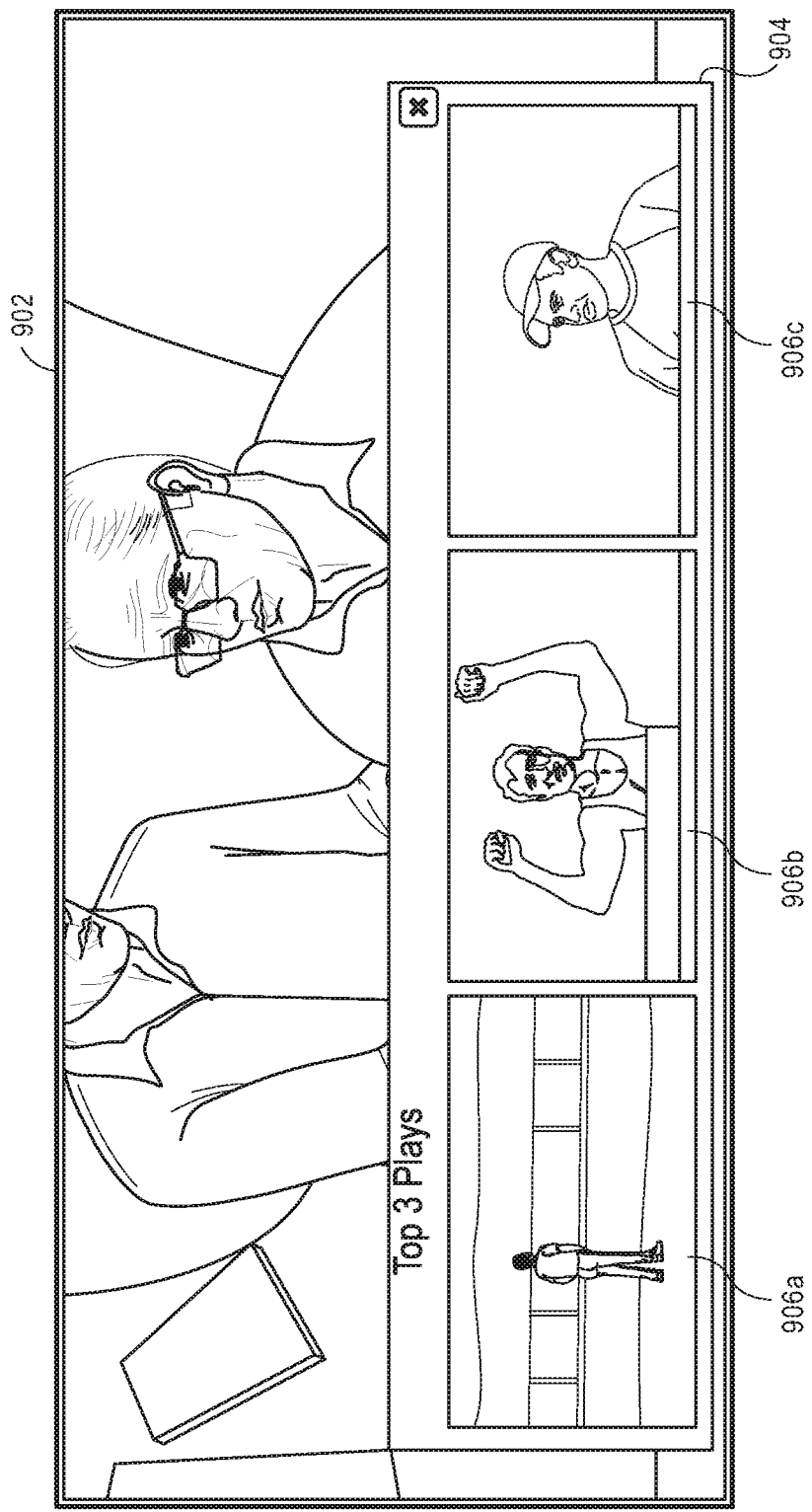
FIG. 9 is an exemplary user interface view.

FIG. 9 is a view of an exemplary user interface that is employing the zooming techniques described herein. In particular, FIG. 9 shows a zoomed in rendering 902 of a television broadcast. In particular, rendering 902 shows a particular sportscaster. Based on rendering 902, contextual content is provided in a window 904. This contextual content pertains to sporting events covered by this sportscaster. In particular, window 904 includes renderings 906a-c of such sporting events.

Through the zooming features described herein, embodiments use hooks from the user interaction (e.g., with a media platform's zooming hardware/software) to do both media (e.g., television content) manipulation, as well as enrich it with contextual content before rendering it on a compelling UI. As a result, a rich dimension is provided regarding how viewers can interact with content. Moreover, through these techniques, a user may preview multiple different types of content at the same time (e.g., by zooming out), or dive deep into rich contextual information about a single piece of content.

Moreover, different kinds of content may be brought together in ways desired by a user, through a familiar zooming in and zooming out interaction. For instance, with a simple zoom in operation, information about content being watching may be automatically displayed right next to the content. Thus, a user does not have to open another window to search for that information or leave the current window or application to do a search elsewhere. Conversely, with a simple zoom out operation, the user can instantly see all the content they have open and preview them at the same time. Thus, embodiments keep users within their existing experience, while giving them access to rich content without move them away from one application or UI silo into another.

Consumers have a very limited ability to personalize received content (e.g., television programs). For instance, a user is currently limited to receiving content recommendations based on their simple usage patterns. Embodiments provide techniques to create personalized content as it relates to activities a user is performing or content the user is viewing.

More particularly, embodiments provide for users (e.g., television viewers) to employ a mechanism that creates rich personalized "mashups" of content relating to the content they are currently consuming (e.g., viewing), whether it's broadband, broadcast or personal content. These mashups may advantageously combine content from multiple sources in ways that are relevant to the user's activity or interest. Such mechanisms may advantageously remove people from silo'd interaction with applications and let them go between content and applications in a simple manner.

In embodiments, the generation of such mashups involves an interaction paradigm (such as drag & drop, flag, or tag) that helps a user combine content in interesting new ways.

For instance, a user may graphically drop a menu on top of a content item to provide a content relating to the intersection of these elements. As an example, an internet Movie Database (iMDB) menu may be placed on top of a video content item. Based on this placement, the user may access iMDB information relating to the video being viewed. As a result, an end user is provided with the ability to combine any number of content pieces together and render it in a UI on top of the content.

Further, embodiments may provide a mechanism for combining or relating different pieces of content so that contextual content can be delivered to end user. This may involve a scan being performed on all the content currently being rendered. From this scanning, an analysis may be continually performed on all of the outputted content. Such analysis may generate metadata regarding each content item. Examples of such content include (but are not limited to) genre, tag, details of the people in the content, etc.

If the user combines content items (e.g., places one content item with another content item), the metadata corresponding to each of these content items is analyzed. For example, matching metadata items may be determined. Based on such analysis, searches (e.g., through internet search engines) may be automatically performed. Results of such searching may then be displayed to the user. In embodiments, such searching may provide information regarding common characteristics of multiple content items.

Also, embodiments may provide mechanisms for learning associations between content items and/or content sources. For instance, over time, actions performed by a user to combine content may generate particular associations in a user profile. Such associations may be between content items and/or content sources.

As a result, contextual content regarding the combination of content items and/or content sources may be generated in advance based at least on such user profiles and/or content that is currently being output. Such automatic generation may be in the form of one or more user interface elements.

For example, a user-activatable element (e.g., a button) corresponding to a particular content item or content source may be provided with the rendering of a content item. Upon activation of this element, a generation of contextual content may occur. As described above, this may involve obtaining and analyzing metadata from the different content items and/or content sources. Alternatively or additionally, this may involve using metadata from a content item to initiate a search through a content provider (e.g., an internet search engine or database) associated with the user-activatable element.

As an illustrative example, an iMDB widget or button may be placed on top of video content (e.g., video content from an internet view source). This placement may be based on a user profile that was developed based on previous combining initiated by the user. Also, in embodiments, this placement may occur when certain display characteristics exist (e.g., when the content item is zoomed in beyond a predetermined threshold, such as 100%). By activating this widget or button, iMDB search results corresponding to the content item may be obtained. In embodiments, such search results may be archived.

Thus, these mashup or combining techniques may advantageously allow users to relate different pieces of content in a novel way. For instance, contextual content may be created for anything that is being consumed or viewed (e.g., television programs). Moreover, through such techniques, users are not limited to what is provided by the particular provider of the content item. Further, these techniques allow for different pieces of information to be related and combined together, thus giving the user a rich and personalized experience.

Figure 10:
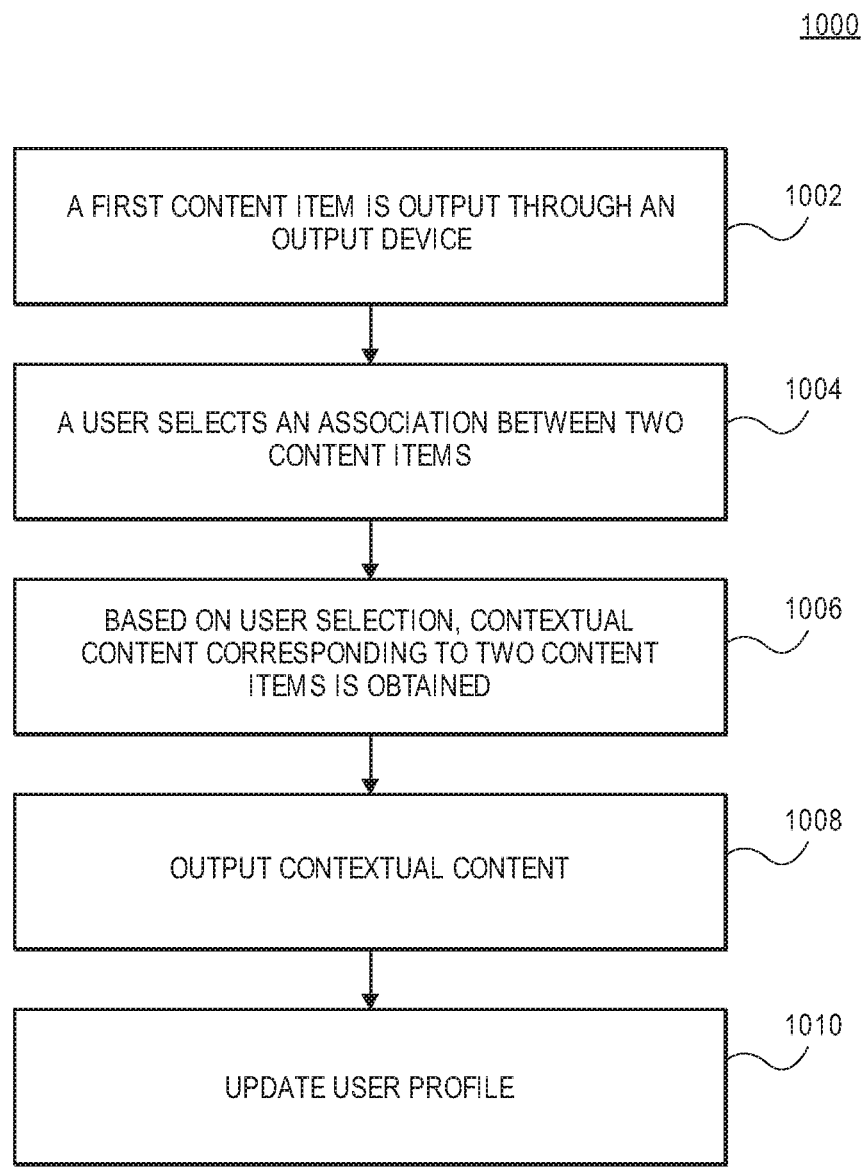
FIG. 10 is a logic flow diagram.

FIG. 10 illustrates an exemplary logic flow 1000, which may be representative of operations executed by one or more embodiments described herein. Thus, this flow may be employed in the context of FIG. 1. Embodiments, however, are not limited to this context. Also, although FIG. 10 shows particular sequences, other sequences may be employed. Moreover, the depicted operations may be performed in various parallel and/or sequential combinations.

At a block 1002, a first content item is output through an output device (e.g., through a display).

At a block 1004, a user selects an association between the first content item and a second content item. In embodiments, the user may make this selection through interaction with a graphical user interface. As described herein, this may involve activating a button or widget that is displayed with the first content item. Alternatively, this may involve the user graphically combining (e.g., overlapping through drag & drop, flag & tag, etc.) the first and second content items.

Based on this selection, a block 1006 is performed in which contextual content pertaining to the first and second content items is obtained. This may involve obtaining metadata for each of the content items and analyzing (e.g., comparing) the metadata to common metadata for the two content items. In turn, a search (e.g., through an internet search engine) may be made based on this analysis. For instance, common metadata may be used in the search.

Alternatively, or additionally, block 1006 may involve using metadata for the first content item to search the second content item. This may be employed, for example, when the second content item is a database (e.g., iMDB).

Based on this, the contextual content is outputted at a block 1008. In embodiments, this outputting may be through a device (e.g., output device 104 of FIG. 1). Further, this contextual content may be provided through a separate user interface element, such as separate window.

At a block 1010, a user profile (e.g., one of user profiles 610 of FIG. 6) may be updated based on the user selection and the resulting contextual content. In embodiments, this may advantageously provide for automatic delivery of content and/or content recommendations to the user.

The operations of FIG. 10 may be performed in various contexts, such as the implementation of FIG. 6. For instance, UI management module 604 may perform operations involving the output of content items and contextual content, as well as the reception of user selections regarding associations. Further, in embodiments, personalization module 602 may perform operations involving the obtaining of contextual content, as well as the updating of user profiles.

Figure 11:
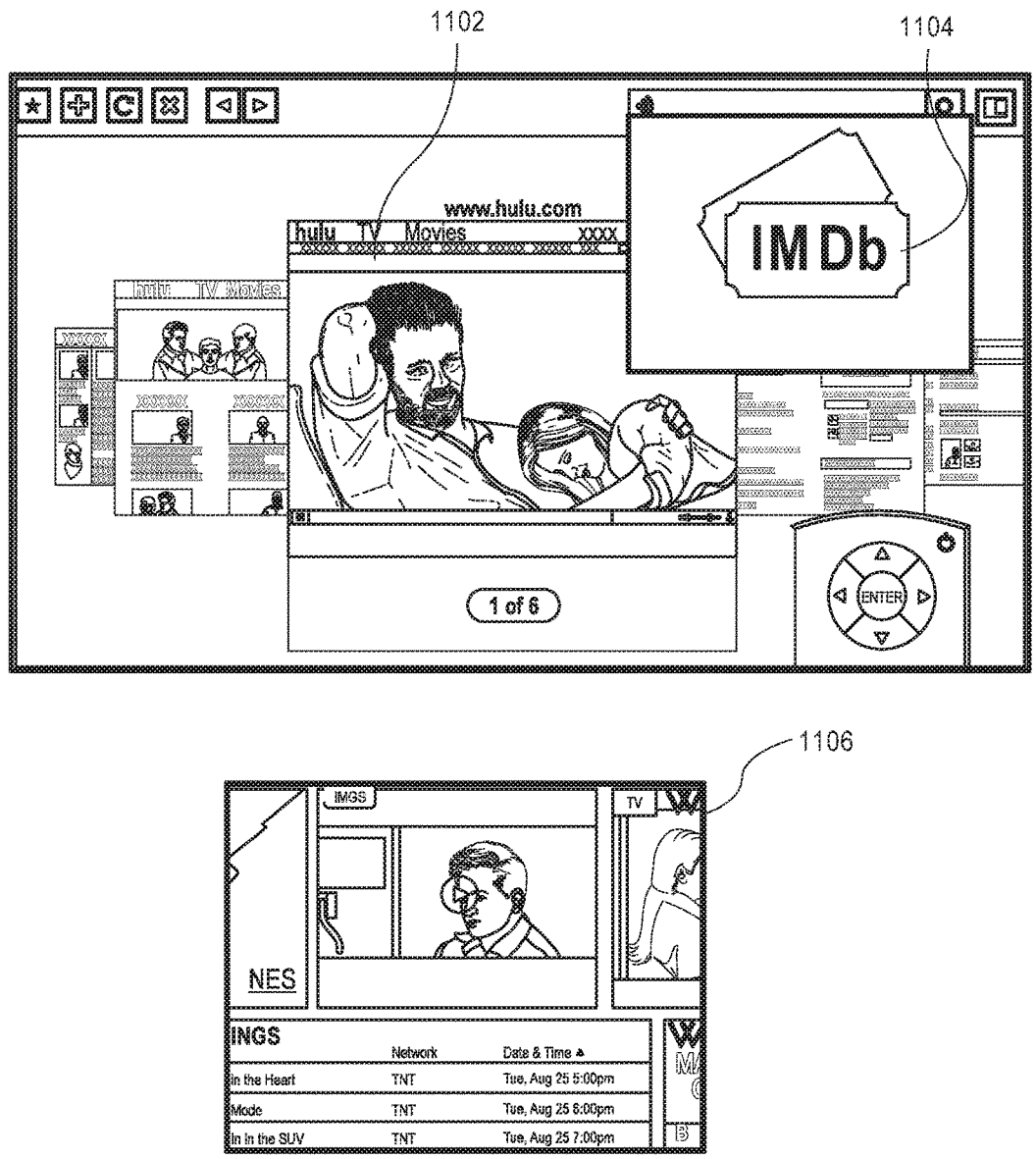
FIG. 11 is an exemplary user interface view.

FIG. 11 is an exemplary user interface view in which the mashup or combining techniques described herein are employed. In particular, FIG. 11 shows a content item 1102 (which is a video provided through a website). Along with content item 1102 is provided an association button 1104. This button corresponds to a second content source (e.g., an internet database). As described herein, activation of this button will initiate the generation of contextual content that involves both content sources.

Accordingly, FIG. 11 further shows contextual content user interface element 1 106. This element includes information generated from searching the content item corresponding to button 1104 with metadata (e.g., actors' names, title, genre, etc.) for content item 1102.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a storage medium or article which is machine readable. The storage medium may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software.

As described herein, embodiments may include storage media or machine-readable articles. These may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method, comprising:
receiving a user input of a location and a user-determined amount of zoom into a displayed video content item;
outputting a zoomed rendering of the displayed video content item, the zoomed rendering including an image of an object;
searching within the zoomed rendering, using an image processing technique and the image of the object to identify the object within the zoomed rendering;
retrieving metadata corresponding to the identified object in response to the zoomed rendering;
searching, using the metadata, for derived content associated with the metadata and the identified object; and outputting a contextual rendering, wherein the contextual rendering includes the zoomed displayed video content item and the derived content obtained using the metadata.

2. The method of claim 1, wherein the search for derived content includes searching a web search engine.

3. The method of claim 1, wherein the content item is a television program.

4. The method of claim 1, wherein the image processing technique includes image pattern recognition.

5. The method of claim 4, wherein the zooming selection indicates a position on the display device for the zoomed rendering.

6. The method of claim 1, wherein outputting the zoomed rendering comprises block scaling an image of the content item.

7. The method of claim 1, further comprising obtaining additional content using the obtained metadata by searching for the additional content and outputting the additional content as an additional user interface element on the display.

8. The method of claim 7, further comprising indexing the obtained additional content according to positions within the content item.

9. The method of claim 1, wherein recognizing the object comprises searching the zoomed media rendering of the content item using a pattern recognition technique in response to the zooming to find an object that is recognized using a database of objects.

10. The method of claim 1, wherein the content item is a video and the zoomed rendering represents the video, the method further comprising repeating obtaining and outputting with changes in the rendered video.

11. An article comprising a non-transitory machine-accessible medium having stored thereon instructions that, when executed by a machine, cause the machine to perform operations comprising:
receiving a user input of a location and a user-determined amount of zoom into a displayed video content item;
outputting a zoomed rendering of the displayed video content item the zoomed rendering including an image of an object;
searching within the zoomed rendering, using an image processing technique and the image of the object to identify the object within the zoomed rendering;
retrieving metadata corresponding to the identified object in response to the zoomed rendering;
searching, using the metadata, for derived content associated with the metadata and the identified object; and
outputting a contextual rendering, wherein the contextual rendering includes the zoomed displayed video content item and the derived content obtained using the metadata.

12. The method of claim 11, wherein recognizing the object comprises searching the zoomed media rendering of the content item using a pattern recognition technique to find an object that is recognized using a database of objects.

13. The method of claim 11, wherein the zoomed rendering represents the video, the method further comprising repeating obtaining and outputting with changes in the rendered video.

14. An apparatus, comprising:
a zoom management module to receive user input of a location and a user-determined amount of zoom into a displayed video content item, generate a zoomed rendering of the display video content item for a display device based on the amount of user zooming selection, the zoomed rendering including an image of an object;
a metadata retrieval module to search with the zoomed rendering, using an image processing technique and the image of the object to identify the object within the zoomed rendering and to retrieve metadata corresponding to the identified object in response to the zoomed rendering, and to search using the metadata, for derived content associated with the metadata and the identified object;
a contextual content output module to generate a contextual content rendering, the contextual content rendering including the zoomed displayed video content item and the derived content obtained using the metadata.

15. The apparatus of claim 14, wherein the metadata retrieval module further obtains additional content using the obtained metadata and wherein the contextual content rendering includes content derived from metadata corresponding to the zoomed rendering.

16. The apparatus of claim 14, further comprising an output display device to display the zoomed rendering and the contextual content rendering.

17. The apparatus of claim 14, further comprising:
a personalization module to select multiple content items based at least on a user profile; and
a user interface management module to render the multiple content items through one or more user interface elements and to receive the user zooming selection to generate the zoomed rendering of one of the multiple content items.

18. The apparatus of claim 14, further comprising a user management module to generate a user profile based at least upon previous content selections of the user.

19. The apparatus of claim 14, further comprising a database containing metadata corresponding to a plurality of objects and wherein the metadata retrieval module obtains the metadata by searching the database.

20. The apparatus of claim 14, further comprising a database of recognized object patterns and wherein the metadata retrieval module obtains metadata by searching the zoomed media rendering of the content item using a pattern recognition technique to find an object that is recognized using the database of objects.

* * * * *